April 3, 1945.   F. NETTEL ET AL   2,372,846
WATER DISTILLATION
Filed Aug. 5, 1942
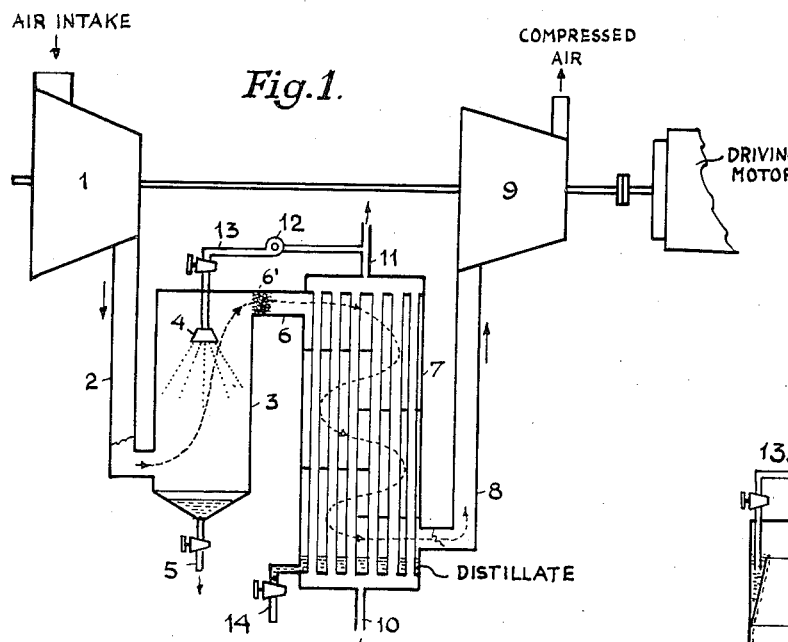
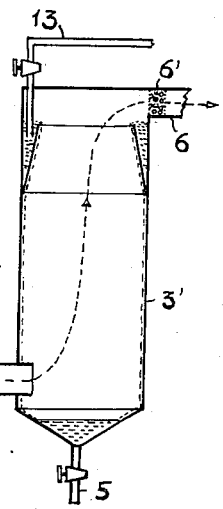
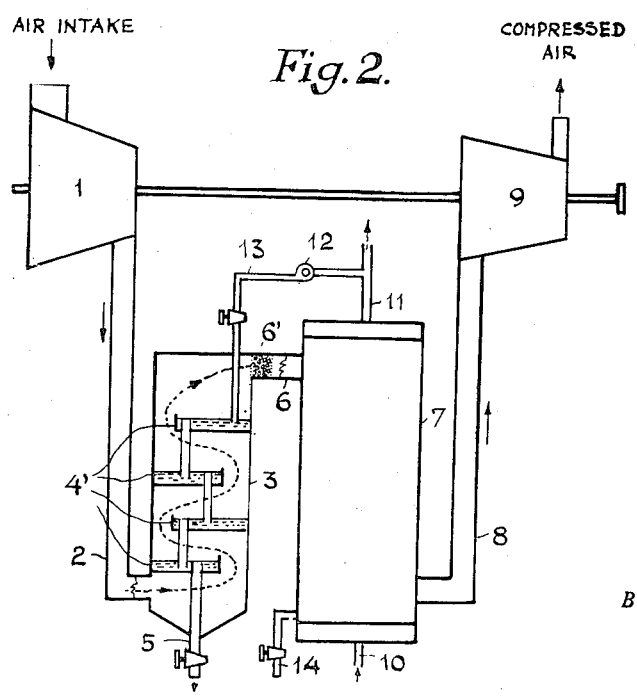
INVENTORS
BY Frederick Nettel.
Johann Kreisinger Patented Apr. 3, 1945

2,372,846

UNITED STATES PATENT OFFICE 2,372,846

WATER DISTILLATION

Frederick Nettel, Manhasset, and Johann Kreitner, New York, N. Y.

Application August 5, 1942, Serial No. 453,758

4 Claims. (Cl. 202—152)

The present invention relates to means for water distillation in air compressor plants employing intercoolers between stages of compression, and particularly to compressors handling large air quantities such as is the case in combustion turbine plants, furnace blower plants and the like.

It is known in the art of reciprocating compressors and heat engines to inject water into the compressor cylinder for the purpose of reducing the compression work, and to cool the compressed air thereafter, thereby recovering the injection water.

It is also known to produce fresh water by distillation from raw water, including sea water, by injecting a spray of warm cooling water from internal combustion engines into the intake air of such engines, thereby evaporating a portion, which is condensed out again immediately afterwards in a water cooled surface air cooler specially provided for this purpose.

It is obvious that the first mentioned method is unsuitable for dirty raw water, and still less for sea water, because of sediments forming in the cylinder.

The second mentioned method is not capable of producing appreciable quantities of distilled water due to the fact that cold air can absorb only very small quantities up to the saturation point, and because the heat available in the warm cooling water is not sufficient to assist materially in humidifying the air at higher temperatures.

As will hereafter more fully appear, the present invention contemplates means to distil relatively large quantities of raw water, including sea water, efficiently and with little additional equipment for this purpose.

This object is achieved by utilizing part of the heat of compression, which is anyway rejected between stages of compression, for evaporating raw water under pressure, by bringing it in direct contact with the compressed hot air issuing from a stage compressor, said air supplying the heat of evaporation. The thus humidified air is thereafter cooled in a surface type air intercooler, which is in any case provided for the purpose of economic air compression, double use being thus made of said intercooler, namely cooling the air, and condensing part of the water vapor out of that air as fresh water.

It is another specific object of this invention to reduce the size of said intercooler, which is brought about by the fact that the condensing vapors wet the cooling surface (tubes for example), thereby materially facilitating the heat transfer between the compressed air and the cooling medium, for example water, flowing through the intercooler.

Since humidification takes place at a pressure higher than the atmospheric pressure, and at comparatively high temperatures, the necessary humidifier chamber can be made relatively small.

Multiple stage air compressors with intercoolers have been first recognized by the applicants to be particularly suited for water distillation, firstly because of the east with which the hot air can be humidified, secondly because only a very simple humidifier is necessary as additional equipment for water distillation, and thirdly because the condensing vapors permit a reduction in size of the air intercooler.

This invention allows particularly favorable application in combustion turbine plants where large air quantities are required per horsepower produced, and where consequently large quantities of water can be distilled by waste heat simply and economically.

Various embodiments of the present invention are hereafter described by way of non-limiting examples, with reference to the accompanying drawings, in which Fig. 1 is a diagrammatic representation illustrating a plant with a spray-type humidifier, Fig. 2 shows an alternative with a water pan-type humidifier, while Fig. 3 indicates a wet surface type humidifier.

The simplicity of the whole arrangement becomes obvious from Fig. 1 where the hot compressed air issuing from stage compressor 1 through pipe 2 flows into the spray-type humidifier chamber 3, equipped with a water spray nozzle 4. While flowing through this chamber, the air is humidified while being cooled somewhat. Surplus water is discharged through valved pipe 5. The humid air continues, as indicated by dotted line, via pipe 6 to the surface intercooler 7, through the latter, and out via pipe 8, to enter the next stage compressor 9. In pipe 6 a layer of filling bodies, for example Raschig rings, 6' is provided which serves to prevent raw water particles from being carried over into the intercooler 7. Said intercooler is supplied with cooling water (raw water) through pipe 10, being discharged through pipe 11. From this pipe a portion of the water is branched off to pump 12, which supplies water to the spray nozzle 4 through the valved pipe 13. The condensed fresh water accumulates at the lower end of intercooler 7 as indicated and is withdrawn through valved pipe 14.

The arrangement as per Fig. 2 differs from that shown in Fig. 1 only in that the spray nozzle is replaced by a number of water trays 4', over which the raw water flows slowly down and out through valved pipe 5. Spraying of water is avoided thus reducing the tendency of carry-over of impurities (salt in the case of sea water) into the intercooler.

Fig. 3 shows an alternative type of humidifier 3' in which the raw water is made to flow along the inner surfaces of the humidifier chamber, also for the purpose of avoiding water spray.

The hot surplus water from the humidifier may be used for any purpose.

While turbo-type axial flow compressors have been shown in the examples, it is immaterial for the purposes of this invention what type of compressor or compressors is used, it being essential only that the plant employs a surface type intercooler.

While the construction and arrangement of the plants herein described are of a generally preferred form, obviously modifications may be made without departing from the spirit of the invention or the scope of the claims.

What we claim is:

1. In a multiple stage air compressor plant including a surface type intercooler between successive compressors, a humidifier chamber connected to receive hot compressed air from a stage compressor, means to admit raw water in spray form to said chamber, conduit means to discharge the humid air from said chamber, first to said surface intercooler and thereafter to the next stage compressor, and means for withdrawing the condensed water from said surface air intercooler.

2. In a multiple stage air compressor plant including a surface type intercooler between successive compressors, a humidifier chamber connected to receive hot compressed air from a stage compressor, means in said chamber to expose a substantial integral open water surface, formed by stagnant or slowly flowing raw water, to the stream of the hot air flowing through it, conduit means to discharge the humid air from said chamber, first to said surface air intercooler, and thereafter to the next stage compressor, and means for withdrawing the condensed water from said surface intercooler.

3. In an air compressor plant as per claim 1, means for directing the water spray substantially in counterflow to the compressed air stream.

4. In an air compressor plant as per claim 2, means for directing the water flow substantially in counterflow to the compressed air stream.

FREDERICK NETTEL.
JOHANN KREITNER.